(12) United States Patent
Franzas et al.

(10) Patent No.: US 11,484,793 B1
(45) Date of Patent: Nov. 1, 2022

(54) GAME CONTROL

(71) Applicant: Supercell Oy, Helsinki (FI)

(72) Inventors: Jon Franzas, Helsinki (FI); Touko Tahkokallio, Helsinki (FI); Jonas Collaros, Helsinki (FI); Patrick Corander, Helsinki (FI); Rauli Laatikainen, Espoo (FI); Sergio Castaño, Helsinki (FI)

(73) Assignee: Supercell Oy, Helsinki (FI)

( * ) Notice: Subject to any disclaimer, the term of this patent is extended or adjusted under 35 U.S.C. 154(b) by 0 days.

(21) Appl. No.: 17/464,878

(22) Filed: Sep. 2, 2021

(51) Int. Cl.
*A63F 13/56* (2014.01)
*A63F 13/2145* (2014.01)
*G06F 3/0488* (2022.01)
*A63F 13/92* (2014.01)

(52) U.S. Cl.
CPC .......... *A63F 13/56* (2014.09); *A63F 13/2145* (2014.09); *A63F 13/92* (2014.09); *G06F 3/0488* (2013.01); *A63F 2300/308* (2013.01)

(58) Field of Classification Search
None
See application file for complete search history.

(56) References Cited

U.S. PATENT DOCUMENTS

| | | | | |
|---|---|---|---|---|
| 8,512,115 | B2* | 8/2013 | Namba | A63F 13/5378 463/31 |
| 10,071,313 | B2* | 9/2018 | Motokura | A63F 13/56 |
| 2002/0119811 | A1* | 8/2002 | Yabe | A63F 13/10 463/8 |
| 2004/0157662 | A1* | 8/2004 | Tsuchiya | A63F 13/10 463/32 |
| 2005/0119050 | A1* | 6/2005 | Suzuki | A63F 13/55 463/36 |
| 2005/0221880 | A1* | 10/2005 | Kando | A63F 13/10 463/9 |
| 2014/0357356 | A1* | 12/2014 | Horie | A63F 13/2145 463/31 |
| 2015/0031421 | A1* | 1/2015 | Jo | A63F 13/837 463/2 |
| 2015/0051001 | A1* | 2/2015 | Linden | A63F 13/795 463/42 |

(Continued)

OTHER PUBLICATIONS

Mysterio, League of Legends—Show Attack Range Indicator Circle (2 Methods), Nov. 20, 2019, https://www.youtube.com/watch?v=TGMpu5qZaGE, p. 1 (Year: 2019).*

*Primary Examiner* — Tramar Harper
(74) *Attorney, Agent, or Firm* — Ziegler IP Law Group, LLC

(57) ABSTRACT

An apparatus and a method for game control. A graphical user interface is generated and displayed on a display screen. The graphical user interface presents at least one user-controllable object and at least one target object. A user is enabled to provide a user input to control a movement of the at least one user-controllable object within the graphical user interface. A predetermined area is identified around the at least one user-controllable object in the graphical user interface. It is detected whether or not the at least one target object lies within the predetermined area in the graphical user interface. If it is detected that the at least one target object lies within the predetermined area, an action is executed on the at least one target object from the at least one user-controllable object.

16 Claims, 8 Drawing Sheets

(56) References Cited

U.S. PATENT DOCUMENTS

| | | | |
|---|---|---|---|
| 2017/0340959 A1* | 11/2017 | Tang | A63F 13/426 |
| 2017/0361230 A1* | 12/2017 | Tang | A63F 13/422 |
| 2020/0206639 A1* | 7/2020 | Nakano | A63F 13/58 |
| 2020/0298123 A1* | 9/2020 | Yang | A63F 13/35 |
| 2020/0316470 A1* | 10/2020 | Yang | A63F 13/5372 |
| 2022/0032191 A1* | 2/2022 | Wei | A63F 13/5372 |
| 2022/0047947 A1* | 2/2022 | Kmita | A63F 13/537 |

\* cited by examiner

GAME CONTROL

TECHNICAL FIELD

The present disclosure relates to apparatuses for game control via a graphical user interface. Moreover, the present disclosure relates to methods for game control via a graphical user interface. Furthermore, the present disclosure also relates to computer program products comprising a non-transitory computer-readable storage medium having computer-readable instructions stored thereon, the computer-readable instructions being executable by a computing device comprising processing hardware to execute the aforesaid methods.

BACKGROUND

Video games have become a popular form of entertainment in the 21$^{st}$ century. In the past few decades, video games have undergone a phenomenal evolution. Throughout these years, the boundaries of technological development in the field of video games have been constantly pushed, in an attempt to create highly-interactive video games and to provide users with sophisticated gameplay.

Game developers often face significant challenges while developing modern video games. A key requirement of any modern video game is that it should allow users to interact with different elements of the video game with minimum user effort. However, such an interactive game has to be developed keeping in mind a screen size of a display screen on which the game would be presented. Nowadays, most popular video games are available to be played on game consoles, personal computers, smartphones, tablets and the like. Screen sizes of such different devices vary substantially. In particular, display screens of smartphones and tablets are significantly smaller in size. Thus, it is a challenge to display a graphical user interface on a display screen of a smartphone (or a tablet), whilst ensuring that an adequate, yet easy mechanism is made available to a user to provide a user input.

Moreover, many contemporary video games often require many complex actions to be performed by a user, which, in turn, increases the complexity of a game controlling logic. Therefore, user interfaces of such games become very complex and difficult to use for the user, leading to an unpleasant and fatiguing user experience.

Furthermore, another challenge in the development of video games relates to enhancing an operability of a display screen of a device and to make the man-machine interface more efficient and easier to use. In light of the above, it is desirable to reduce the number of interactions required to perform a given user input, so as to decrease the mental as well as physical effort required to be put in by the user.

Therefore, in light of the foregoing discussion, there exists a need to overcome the aforementioned challenges associated with the contemporary video games.

SUMMARY

The present disclosure relates to an apparatus for game control via a graphical user interface. The present disclosure also relates to a method for game control via a graphical user interface. The present disclosure further relates to a computer program product comprising a non-transitory computer-readable storage medium having computer-readable instructions stored thereon, the computer-readable instructions being executable by a computing device comprising processing hardware to execute the aforesaid method. Furthermore, the present disclosure also seeks to provide a solution to the existing problems of game control.

In a first aspect, an embodiment of the present disclosure provides an apparatus for game control via a graphical user interface, the apparatus comprising:
a display screen; and
a processor configured to:
  generate and display the graphical user interface on the display screen, wherein the graphical user interface presents at least one user-controllable object and at least one target object;
  enable a user to provide a user input to control a movement of the at least one user-controllable object within the graphical user interface;
  identify a predetermined area around the at least one user-controllable object in the graphical user interface;
  detect whether or not the at least one target object lies within the predetermined area in the graphical user interface; and
  when it is detected that the at least one target object lies within the predetermined area, execute an action on the at least one target object from the at least one user-controllable object.

In a second aspect, an embodiment of the present disclosure provides a computer-implemented method for game control via a graphical user interface, the method comprising:
  generating and displaying the graphical user interface on a display screen, wherein the graphical user interface presents at least one user-controllable object and at least one target object;
  enabling a user to provide a user input to control a movement of the at least one user-controllable object within the graphical user interface;
  identifying a predetermined area around the at least one user-controllable object in the graphical user interface;
  detecting whether or not the at least one target object lies within the predetermined area in the graphical user interface; and
  when it is detected that the at least one target object lies within the predetermined area, executing an action on the at least one target object from the at least one user-controllable object.

In a third aspect, an embodiment of the present disclosure provides a computer program product comprising a non-transitory computer-readable storage medium having computer-readable instructions stored thereon, the computer-readable instructions being executable by a computing device comprising processing hardware to execute the aforementioned method.

Embodiments of the present disclosure substantially eliminate or at least partially address the aforementioned problems in the prior art, simplify the user's interactions with the graphical user interface, and beneficially reduce the number of actions required to be performed by the user when interacting with the graphical user interface, whilst also facilitating an enhanced control of the graphical user interface, thereby resulting in an improved man-machine interaction between the user and the graphical user interface.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
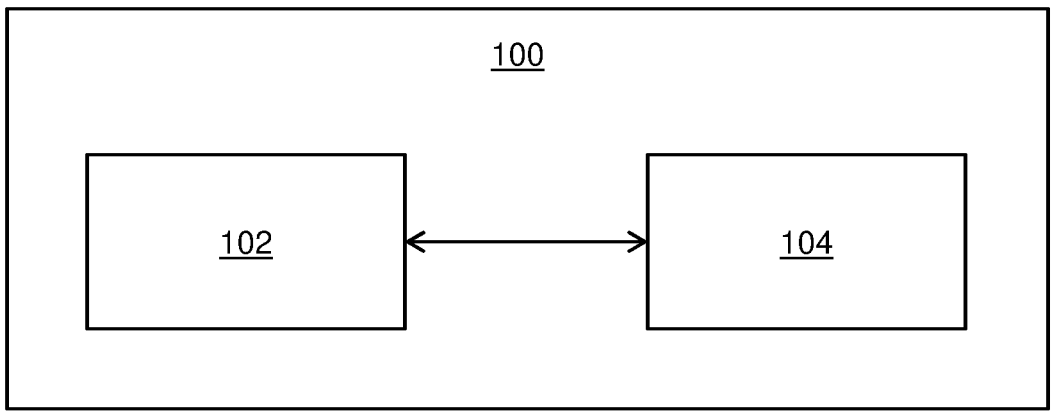
FIG. 1 is a block diagram of architecture of an apparatus for game control via a graphical user interface, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides an apparatus for game control via a graphical user interface, the apparatus comprising:
a display screen; and
a processor configured to:
generate and display the graphical user interface on the display screen, wherein the graphical user interface presents at least one user-controllable object and at least one target object;
enable a user to provide a user input to control a movement of the at least one user-controllable object within the graphical user interface;
identify a predetermined area around the at least one user-controllable object in the graphical user interface;
s detect whether or not the at least one target object lies within the predetermined area in the graphical user interface; and
when it is detected that the at least one target object lies within the predetermined area, execute an action on the at least one target object from the at least one user-controllable object.

In a second aspect, an embodiment of the present disclosure provides a computer-implemented method for game control via a graphical user interface, the method comprising:
generating and displaying the graphical user interface on a display screen, wherein the graphical user interface presents at least one user-controllable object and at least one target object;
enabling a user to provide a user input to control a movement of the at least one user-controllable object within the graphical user interface;
identifying a predetermined area around the at least one user-controllable object in the graphical user interface;
detecting whether or not the at least one target object lies within the predetermined area in the graphical user interface; and
when it is detected that the at least one target object lies within the predetermined area, executing an action on the at least one target object from the at least one user-controllable object.

In a third aspect, an embodiment of the present disclosure provides a computer program product comprising a non-transitory computer-readable storage medium having computer-readable instructions stored thereon, the computer-readable instructions being executable by a computing device comprising processing hardware to execute the aforementioned method.

Embodiments of the present disclosure provide the aforementioned apparatus and method. Pursuant to embodiments of the present disclosure, when it is detected that the at least one target object lies within the predetermined area, the at least one user-controllable object executes the action on the at least one target object. The action is performed without a need for any additional input from the user (namely, apart from the user input provided by the user to control the movement of the at least one user-controllable object within the graphical user interface). Thus, the apparatus facilitates an enhanced game control for the user, by allowing the user to interact with the graphical user interface in a simple and convenient manner. The user's interactions are simplified by reducing the number of inputs required to be provided by the user when interacting with the graphical user interface. This allows for the most efficient and least fatiguing user input into the graphical user interface. This also results in an improved man-machine interaction between the user and the graphical user interface.

The aforesaid graphical user interface pertains to a game. In some implementations, the game can be a single player game in which the at least one target object is computer controlled. In other implementations, the game can be a multiplayer game in which the at least one target object is controlled by other players (namely, players other than the user). In the other implementations, two or more players can together form a team with an aim to defeat target objects controlled by other players.

Throughout the present disclosure, the term "user-controllable object" refers to a graphical object presented via the graphical user interface on the display screen that can be controlled by the user. The at least one user-controllable object comprises a game character or a plurality of game characters in the game.

Throughout the present disclosure, the term "target object" refers to a graphical object presented via the graphical user interface on the display screen with which the at least one user-controllable object may interact. The at least one target object may comprise a game character or a plurality of game characters in the game. Moreover, the at least one target object may also comprise an inanimate object or a plurality of inanimate objects in the game, for example, such as a building, a tanker, a crop and the like.

Optionally, the processor is configured to select the action to be executed on the at least one target object from the at least one user-controllable object, based on at least one of: a type of the at least one user-controllable object, a type of the at least one target object. The type of the at least one user-controllable object is associated with a role and capabilities of the at least one user-controllable object in the game. Likewise, the type of the at least one target object is associated with a role and capabilities of the at least one target object in the game. As an example, if the game is a fight game, the action may, for example, be hitting, wrestling, shooting or similar.

Moreover, optionally, the graphical user interface presents a boost option. Optionally, in this regard, the processor is configured to enable the user to use the boost option to accelerate the action executed by the at least one user-controllable object.

In an implementation, the display screen is touch-sensitive, and enables the user to provide the user input to control the movement of the at least one user-controllable object via touch gestures. In another implementation, the user input is provided using at least one of: a mouse, a touchpad, a pointing stick, a joystick.

The movement of the at least one user-controllable object can be controlled in following ways:

a first way in which the at least one user-controllable object is moved, while keeping a background scene being presented on the graphical user interface stationary, a second way in which the at least one user-controllable object is kept stationary, while the background scene is changed to reveal different regions of interest that lie beyond a current view presented by the graphical user interface, or a combination thereof.

The movement of the at least one user-controllable object causes a change in its location within the graphical user interface. It will be appreciated that the predetermined area changes with a current location of the at least one user-controllable object.

Optionally, the predetermined area is a two-dimensional shape, a centre of the two-dimensional shape being at the current location of the at least one user-controllable object. Examples of the two-dimensional shape include, but are not limited to, a circle, an ellipse, a triangle, a rectangle, a pentagon and any other polygonal shape. Optionally, a distance between the centre and a boundary of the two-dimensional shape lies between 10% and 90% of a distance between opposite sides of the graphical user interface. The distance may be measured in a distance unit (such as cm, inch) or in pixels. As an example, if the distance between the opposite sides of the graphical user interface were 20 cm, the distance between the centre and the boundary of the two-dimensional shape would lie between 2 cm and 18 cm. As another example, if the distance between the opposite sides of the graphical user interface were 1920 pixels, the distance between the centre and the boundary of the two-dimensional shape would lie between 192 pixels and 1728 pixels. More optionally, the distance between the centre and the boundary of the two-dimensional shape lies between 20% and 80% of the distance between the opposite sides of the graphical user interface.

Optionally, the processor is configured to present a boundary indicator representing a boundary of the predetermined area on the graphical user interface. This boundary indicator provides a visual reference to the user. The boundary indicator indicates the predetermined area to the user as an area within which the at least one user-controllable object can execute an action on a given target object. In implementations in which the boundary indicator is presented, the boundary indicator is optionally made semi-transparent. This facilitates better visibility of the scene being presented in the graphical user interface. In other implementations in which no boundary indicator is presented, the predetermined area is optionally made semi-transparent. In yet other implementations, both the boundary indicator and the predetermined area are presented.

Optionally, the processor is configured to present the boundary indicator only while the user provides the user input. That is, only while the at least one user-controllable object moves within the graphical user interface. This enables the user to choose a location in the graphical user interface where she/he wishes to move the at least one user-controllable object.

Moreover, optionally, the graphical user interface presents a control object. Optionally, in this regard, the processor is configured to enable the user to provide the user input via the control object.

Optionally, the processor is configured to:

detect whether or not the control object is located inside the predetermined area while the boundary indicator is presented on the graphical user interface; and when it is detected that the control object is located inside the predetermined area while the boundary indicator is presented on the graphical user interface, re-locate the control object outside the predetermined area.

This improves visibility of the scene being presented in the graphical user interface. Such re-location is performed without a need for any additional input from the user.

Additionally or alternatively, optionally, the processor is configured to enable the user to re-locate the control object within the graphical user interface. Enabling the user to manually change the location of the control object in the graphical user interface provides more control to the user, thereby improving the user experience.

Furthermore, in an embodiment, the processor is configured to present at least one directional indicator representing a direction in which the at least one user-controllable object can be moved to find at least one additional target object that is not currently visible in the graphical user interface. Presenting the at least one directional indicator improves the efficiency of the process of playing the game, and also adds a degree of predictability, sophistication and interest to the game. It will be appreciated that an underlying technical contribution due to the presentation of the at least one directional indicator relates to indicating to the user a direction of a second region of interest that lies beyond the current view presented by the graphical user interface, thereby drawing the user's attention to the second region of interest. Presenting the at least one directional indicator enables the user to receive information pertaining to the second region beyond the current view, without losing focus on the current view.

The manner of presentation of the at least one directional indicator on the graphical user interface credibly assists the user in performing a task by means of a continued and/or guided human-machine interaction process. Thus, the display functionality is expanded with the help of a simple directional indicator, which occupies only a small area on the graphical user interface.

In an implementation, the at least one directional indicator is highlighted or enlarged during or after the execution of the action on the at least one target object. The at least one given directional indicator may be highlighted by adding a special effect thereto. As an example, a given directional indicator may be presented in a bright colour. As another example, a blinking effect or a glowing effect may be added to the given directional indicator.

It will be appreciated that the at least one directional indicator is highlighted or enlarged to serve a technical purpose, namely to enhance the visibility of the at least one directional indicator and is not just displayed for the sake of viewing, but for further enabling a continued man-machine interaction between the user and the graphical user interface. Highlighting or enlarging the at least one directional indicator ensures that it is not concealed by any neighbouring graphical object (for example, such as a game character of another player). Therefore, it will be appreciated that enhancing the visibility of the at least one directional indicator does not merely address a human mental process (i.e., to convey a cognitive meaning of information presented via the graphical user interface), but also contributes an objective technical function to the graphical user interface (namely, by further facilitating a continued man-machine interaction). It will be appreciated that the at least one directional indicator is presented in a manner that improves visibility and enables the user to perform her/his tasks more efficiently.

In an implementation, the at least one directional indicator is displayed along a periphery of the boundary indicator. In another implementation, the at least one directional indicator is displayed along a periphery of the graphical user interface. In such an implementation, the at least one directional indicator is not concealed by any neighbouring graphical object (for example, such as a game character of another player). The technical effect of this is that the usability of the graphical user interface is enhanced.

Moreover, optionally, the at least one user-controllable object comprises a plurality of user-controllable objects. Optionally, the processor is configured to enable the user to control the movement of the plurality of user-controllable objects within the graphical user interface in a synchronized manner, based on the user input. This enables the user to control more than one user-controllable object at a same time, based on a single user input. This greatly simplifies the user's input.

For illustration purposes only, there will now be considered an example in which the plurality of user-controllable objects comprise a first user-controllable object and a second user-controllable object, whose movement can be controlled in a synchronized manner. One such example implementation has been illustrated in conjunction with FIGS. 3A and 3B. By "synchronized manner", it is meant that the plurality of user-controllable objects would be moved together in a same direction with a same speed as per the user input.

Furthermore, optionally, the processor is configured to execute a first action and a second action on the at least one target object from a first user-controllable object and a second user-controllable object, from amongst the plurality of user-controllable objects, respectively, when it is detected that the at least one target object lies within the predetermined area. This enables the user to execute multiple actions via multiple user-controllable objects at the same time, based on the single user input. It will be appreciated that the first action may be the same as or different from the second action.

The present disclosure also relates to the computer-implemented method as described above. Various embodiments and variants disclosed above, with respect to the aforementioned first aspect, apply mutatis mutandis to the method.

Optionally, in the method, the at least one user-controllable object comprises a plurality of user-controllable objects, and wherein the method further comprises enabling the user to control the movement of the plurality of user-controllable objects within the graphical user interface in a synchronized manner, based on the user input.

Moreover, optionally, in the method, the at least one user-controllable object comprises a plurality of user-controllable objects, and wherein the method further comprises executing a first action and a second action on the at least one target object from a first user-controllable object and a second user-controllable object, from amongst the plurality of user-controllable objects, respectively, when it is detected that the at least one target object lies within the predetermined area.

Furthermore, optionally, the method further comprises presenting a boundary indicator representing a boundary of the predetermined area on the graphical user interface.

Optionally, the method further comprises presenting the boundary indicator only while the user provides the user input.

Optionally, in the method, the graphical user interface presents a control object, and wherein the method further comprises enabling the user to provide the user input via the control object.

Optionally, the method further comprises:
detecting whether or not the control object is located inside the predetermined area while the boundary indicator is presented on the graphical user interface; and
when it is detected that the control object is located inside the predetermined area while the boundary indicator is presented on the graphical user interface, re-locating the control object outside the predetermined area.

Additionally or alternatively, optionally, the method further comprises enabling the user to re-locate the control object within the graphical user interface.

Moreover, optionally, in the method, the predetermined area is a two-dimensional shape, a centre of the two-dimensional shape being at a current location of the at least one user-controllable object, a distance between the centre and a boundary of the two-dimensional shape lies between 10% and 90% of a distance between opposite sides of the graphical user interface. More optionally, the distance between the centre and the boundary of the two-dimensional shape lies between 20% and 80% of the distance between the opposite sides of the graphical user interface.

Furthermore, optionally, the method further comprises presenting at least one directional indicator representing a direction in which the at least one user-controllable object can be moved to find at least one additional target object that is not currently visible in the graphical user interface.

DETAILED DESCRIPTION OF THE DRAWINGS

Referring to FIG. 1, illustrated is a block diagram of architecture of an apparatus 100 for game control, in accordance with an embodiment of the present disclosure. The apparatus 100 comprises a display screen 102 and a processor 104. The processor 104 is configured to perform various tasks as described earlier with respect to the aforementioned first aspect.

It may be understood by a person skilled in the art that FIG. 1 includes a simplified architecture of the apparatus 100, for the sake of clarity, which should not unduly limit the scope of the claims herein. The person skilled in the art will recognize many variations, alternatives, and modifications of embodiments of the present disclosure.

Referring to FIGS. 2A-2D, illustrated is a set of example views of a graphical user interface 202, in accordance with an embodiment of the present disclosure. In these example views, there are presented at least one user-controllable object, depicted as a user-controllable object 204, and at least one target object, depicted as a target object 206.

Figure 2A:
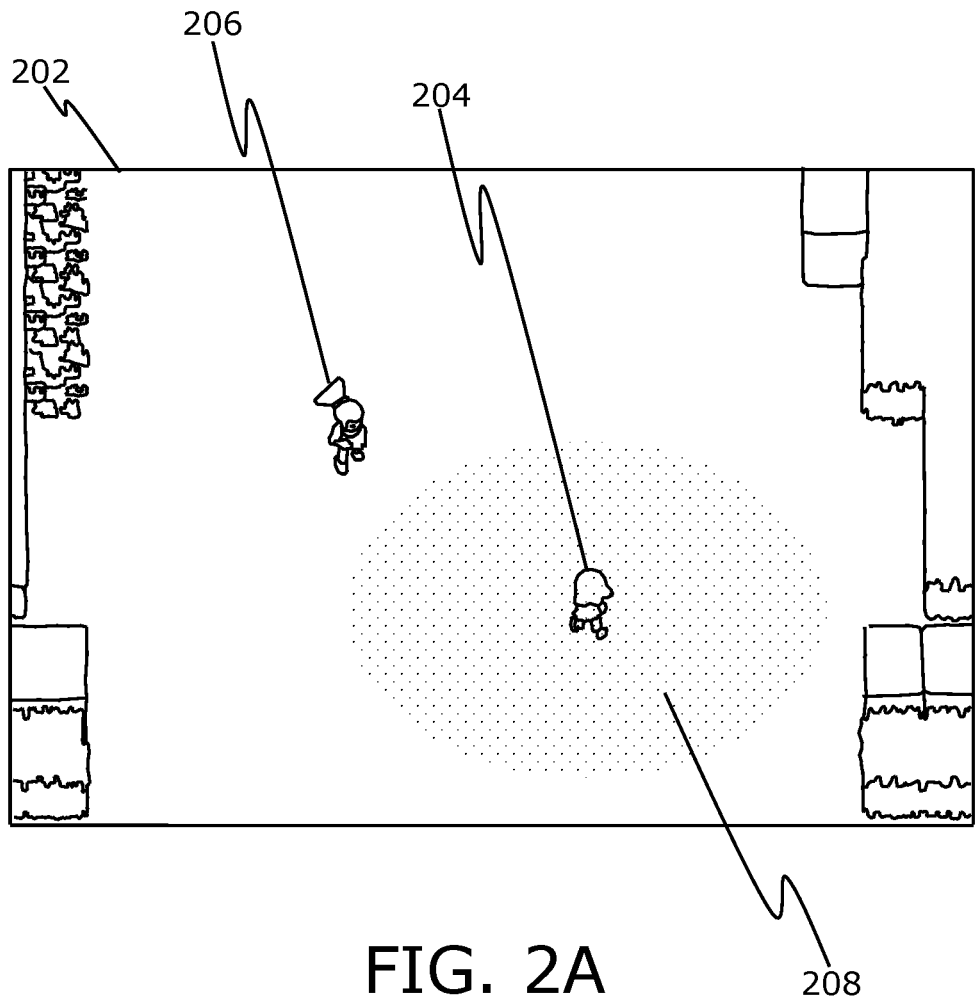
FIGS. 2A-2D depict a set of example views of a graphical user interface, in accordance with an embodiment of the present disclosure.
Figure 2B:
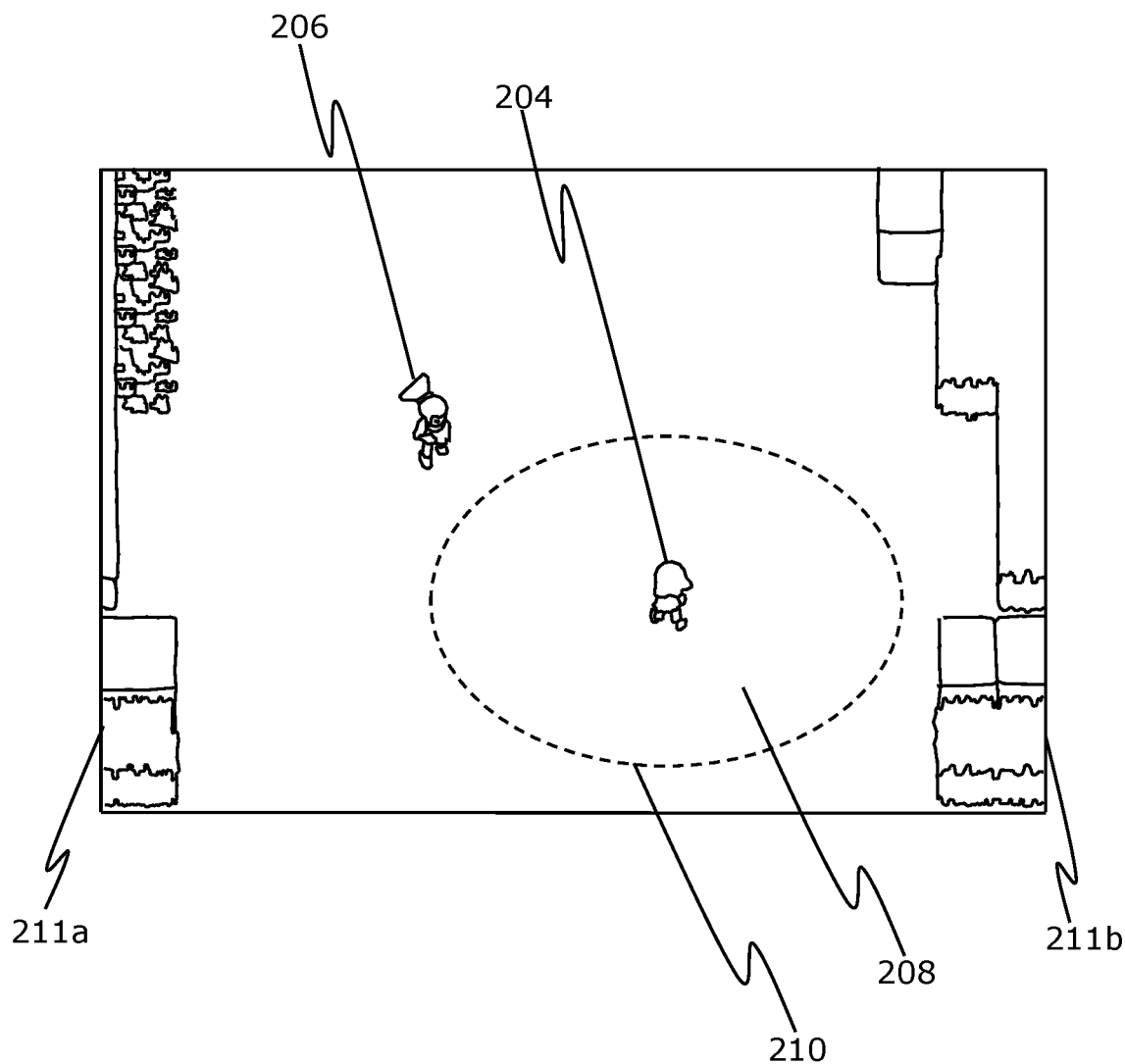
Figure 2C:
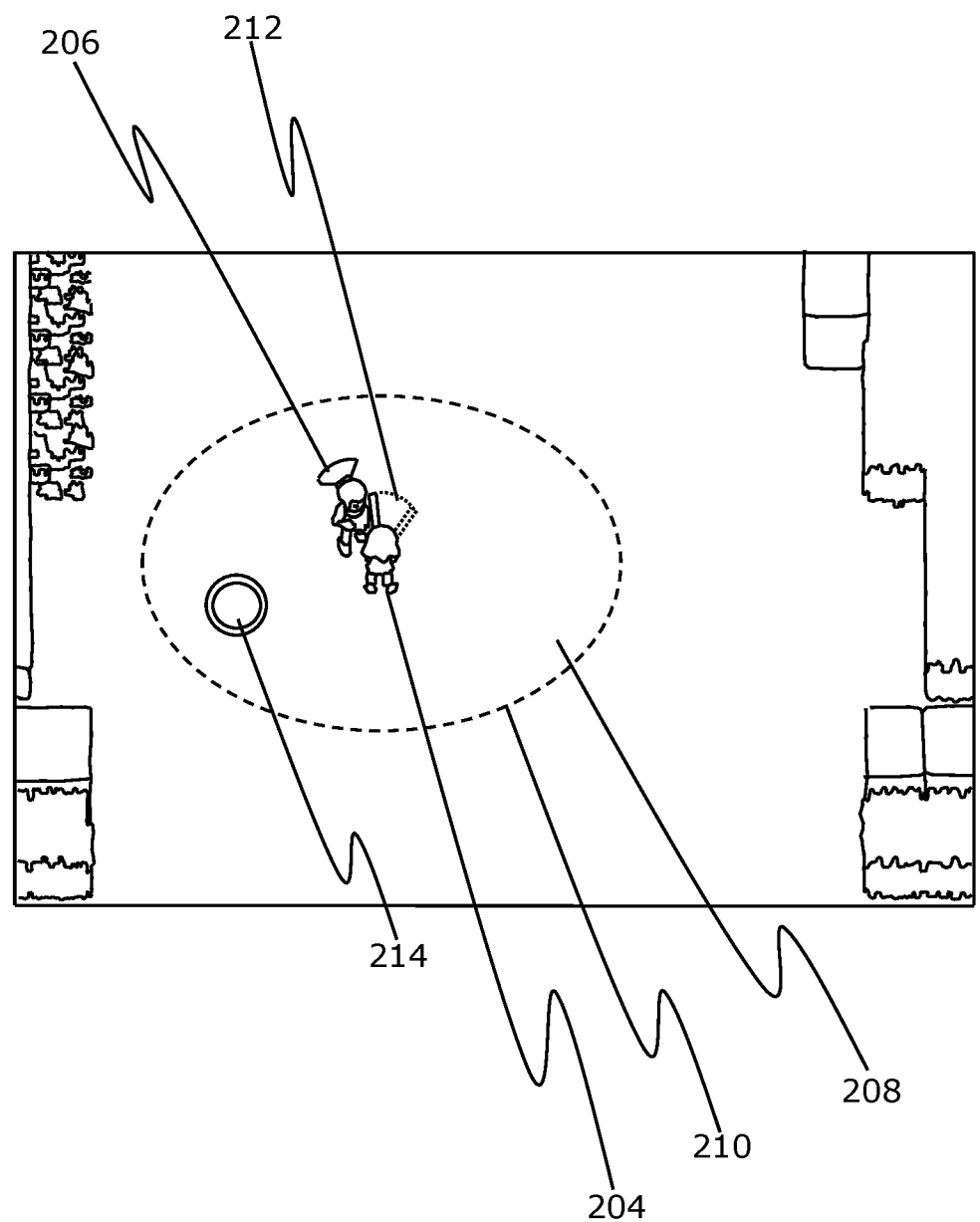
Figure 2D:
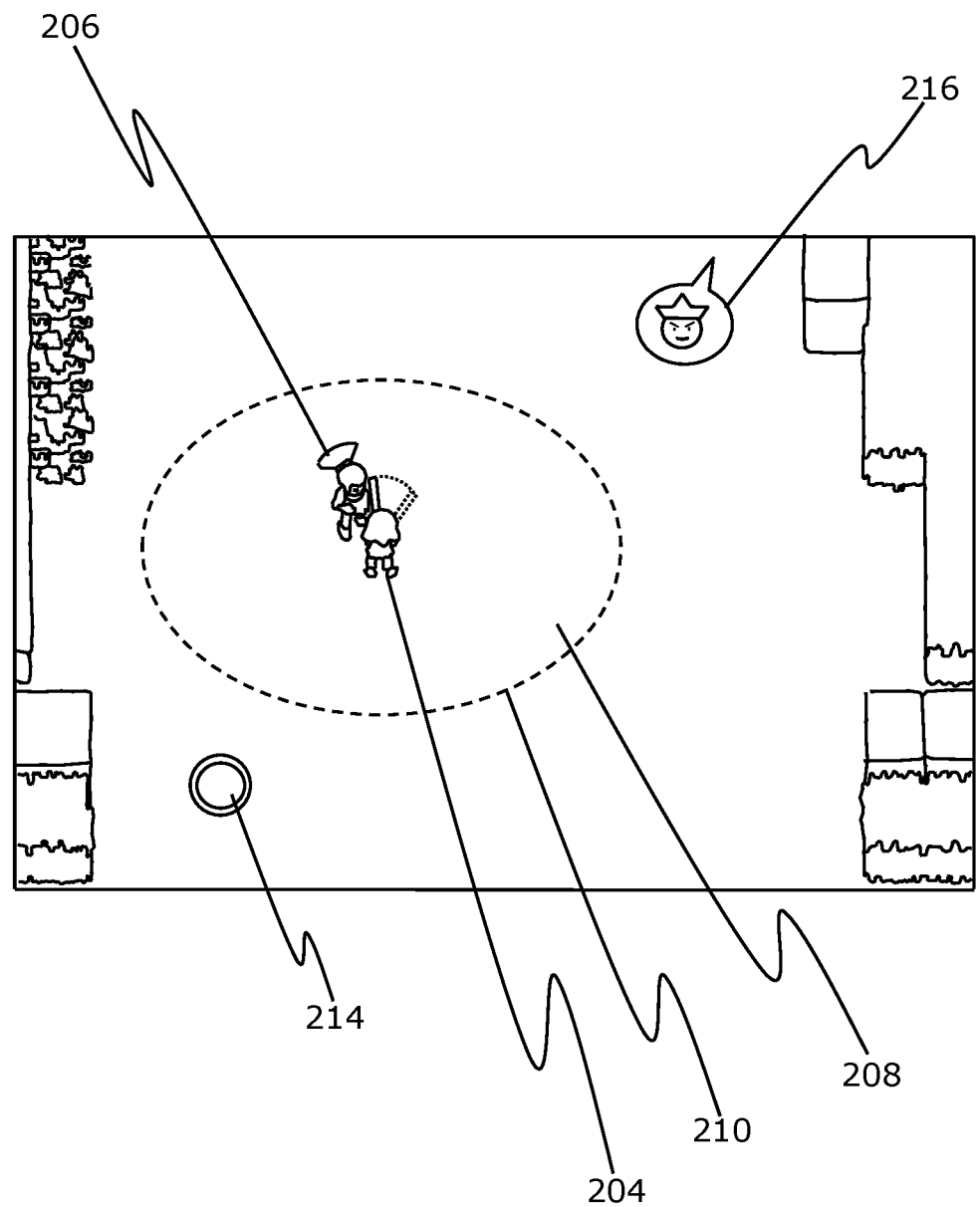

A predetermined area 208 identified around the user-controllable object 204 is presented in the graphical user interface 202. Optionally, the predetermined area 208 is circular (indicated as a dotted ellipse in FIG. 2A, as the examples views are like perspective views). In FIGS. 2B-2D, the graphical user interface 202 optionally presents a boundary indicator 210 representing a boundary of the predetermined area 208. In FIG. 2B, there are also shown opposite sides 211a and 211b of the graphical user interface 202.

As shown in FIGS. 2C-2D, when it is detected that the target object 206 lies within the predetermined area 208, the user-controllable object 204 executes an action 212 on the target object 206.

With reference to FIGS. 2C-2D, the graphical user interface 202 optionally presents a control object 214, via which the user may provide the user input. Optionally, when it is detected that the control object 214 is located inside the predetermined area 208 while the boundary indicator 210 is presented (for example, as shown in FIG. 2C), the control object 214 is re-located outside the predetermined area 208 (for example, as shown in FIG. 2D).

Moreover, with reference to FIG. 2D, the graphical user interface 202 optionally presents at least one directional indicator, depicted as a directional indicator 216 representing a direction in which the user-controllable object 204 can be moved to find at least one additional target object that is not currently visible in the graphical user interface 202.

Figure 3A:
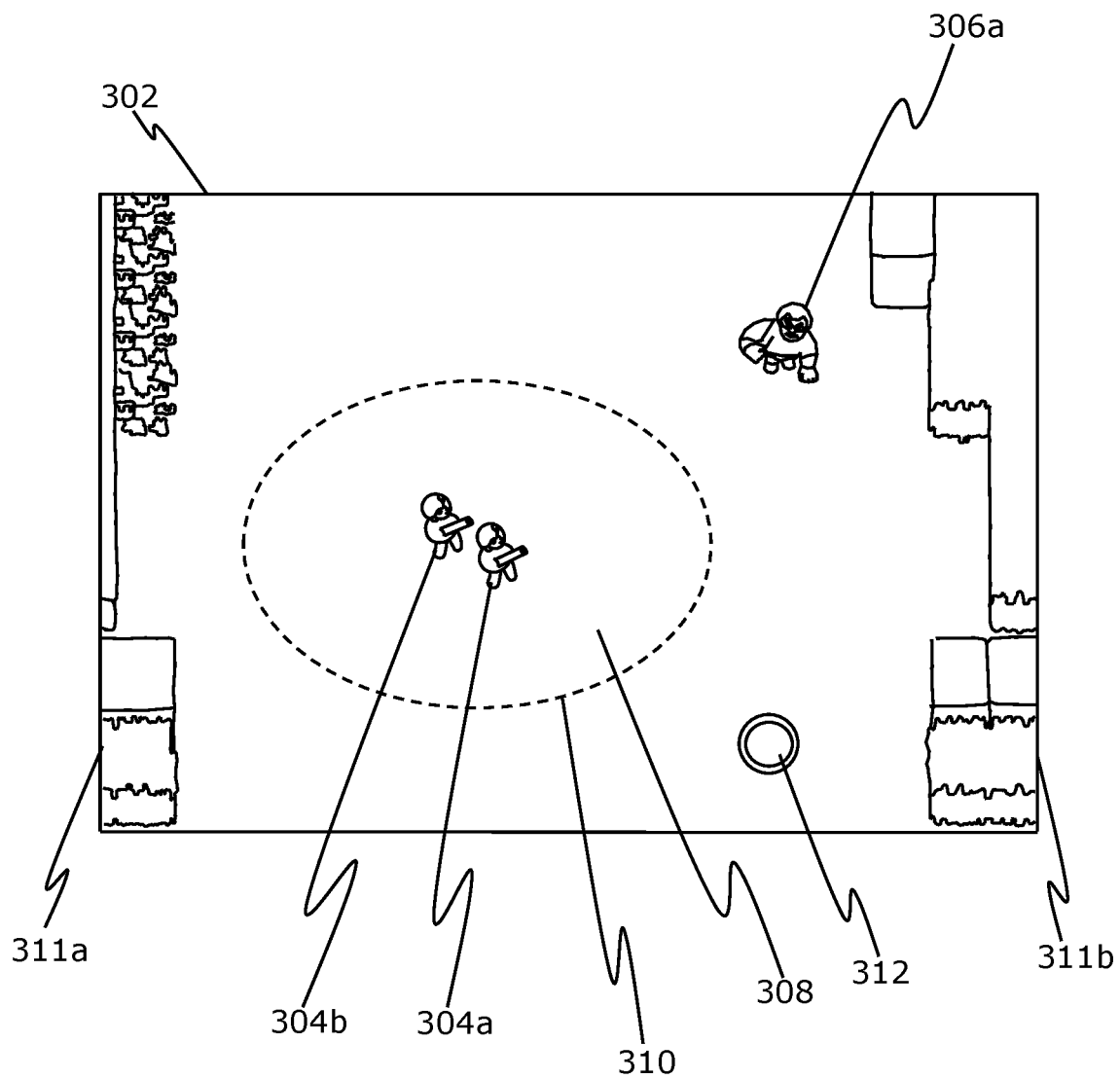
FIGS. 3A-3C depict another set of example views of a graphical user interface, in accordance with an embodiment of the present disclosure.
Figure 3B:
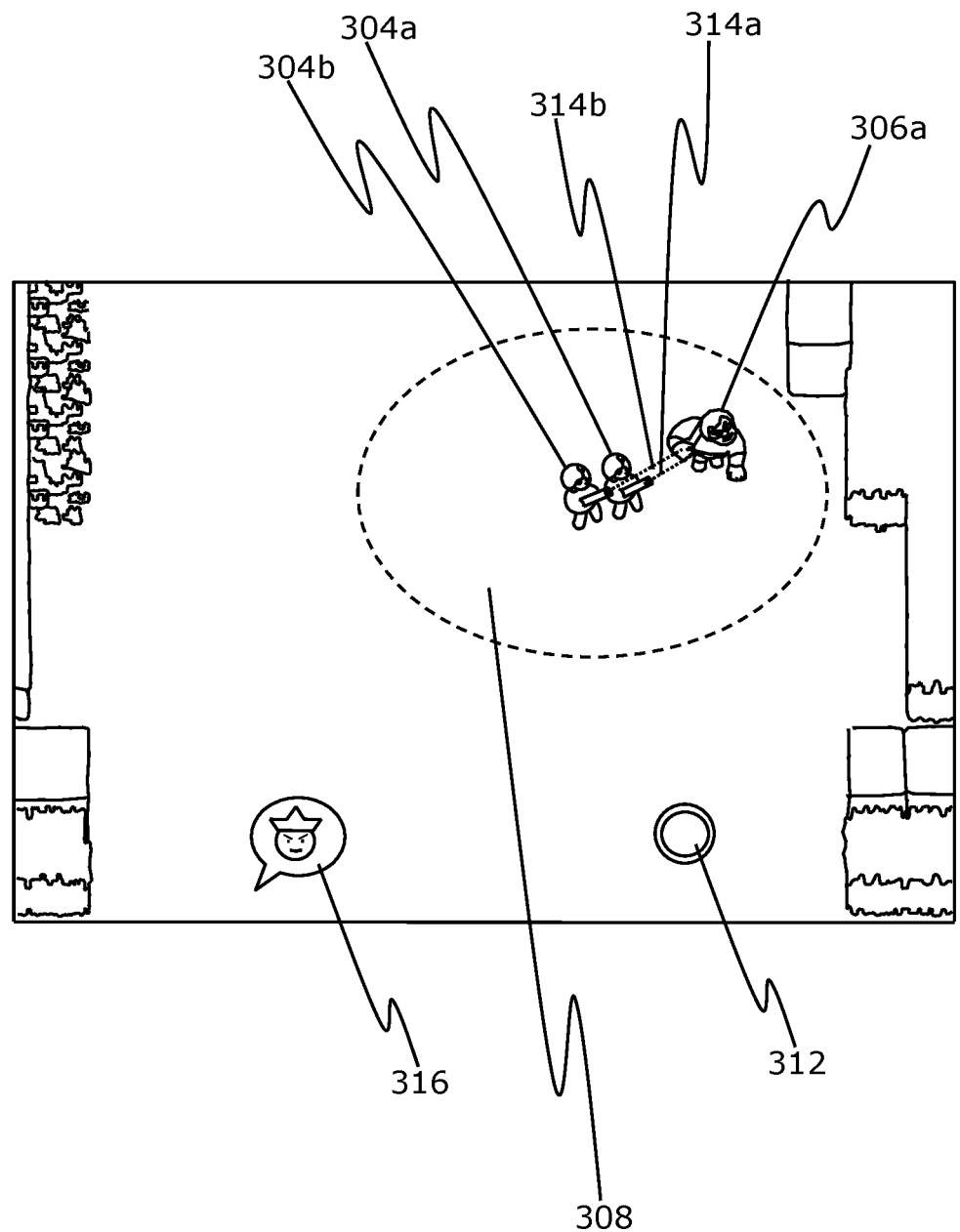
Figure 3C:
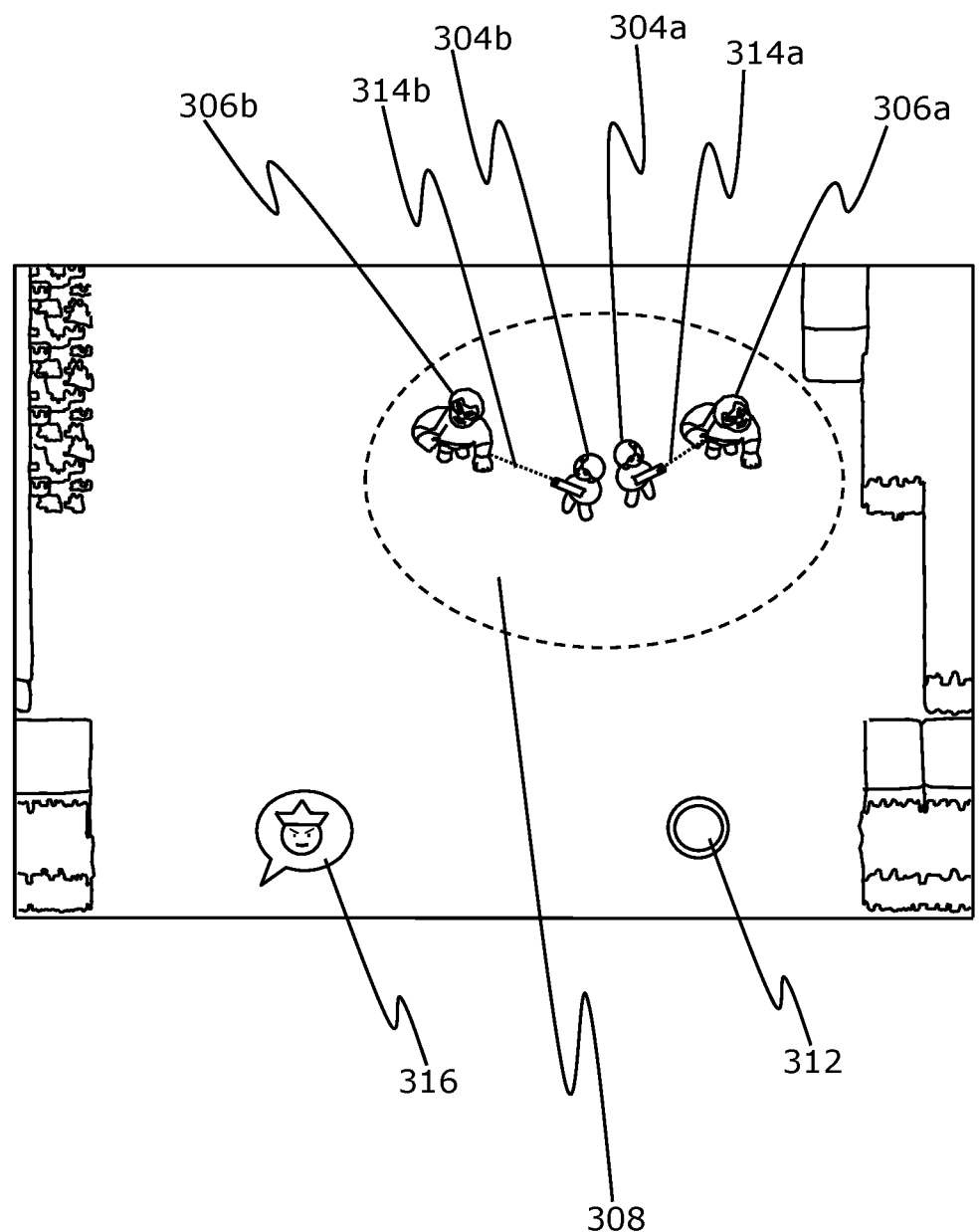

Referring next to FIGS. 3A-3C, illustrated is a set of example views of a graphical user interface 302, in accordance with an embodiment of the present disclosure. In these example views, there are presented at least one user-controllable object, depicted as user-controllable objects 304a and 304b, and at least one target object, depicted as target objects 306a and 306b.

A predetermined area 308 identified around the user-controllable objects 304a and 304b is presented in the graphical user interface 302. The graphical user interface 302 optionally presents a boundary indicator 310 representing a boundary of the predetermined area 308. In FIG. 3A, there are also shown opposite sides 311a and 311b of the graphical user interface 302.

The graphical user interface 302 optionally presents a control object 312, via which a user may provide a user input to control a movement of the user-controllable objects 304a and 304b. Optionally, the graphical user interface 302 allows the user to control the movement of the user-controllable objects 304a and 304b in a synchronized manner, based on the user input.

With reference to FIG. 3B, when it is detected that the target object 306a lies within the predetermined area 308, the user-controllable objects 304a and 304b execute a first action 314a and a second action 314b, respectively, on the target object 306a.

With reference to FIG. 3C, when it is detected that both the target objects 306a and 306b lie within the predetermined area 308, the user-controllable objects 304a and 304b execute the first action 314a and the second action 314b on the target objects 306a and 306b, respectively. Alternatively, the user-controllable objects 304a and 304b may execute the first action 314a and the second action 314b together, first on one of the target objects 306a and 306b, and then on another of the target objects 306a and 306b.

Moreover, with reference to FIGS. 3B-3C, the graphical user interface 302 optionally presents at least one directional indicator, depicted as a directional indicator 316 representing a direction in which the user-controllable objects 304a and 304b can be moved to find at least one additional target object that is not currently visible in the graphical user interface 302.

FIGS. 2A-2D and 3A-3C are merely examples, which should not unduly limit the scope of the claims herein. The person skilled in the art will recognize many variations, alternatives, and modifications of embodiments of the present disclosure.

Figure 4:
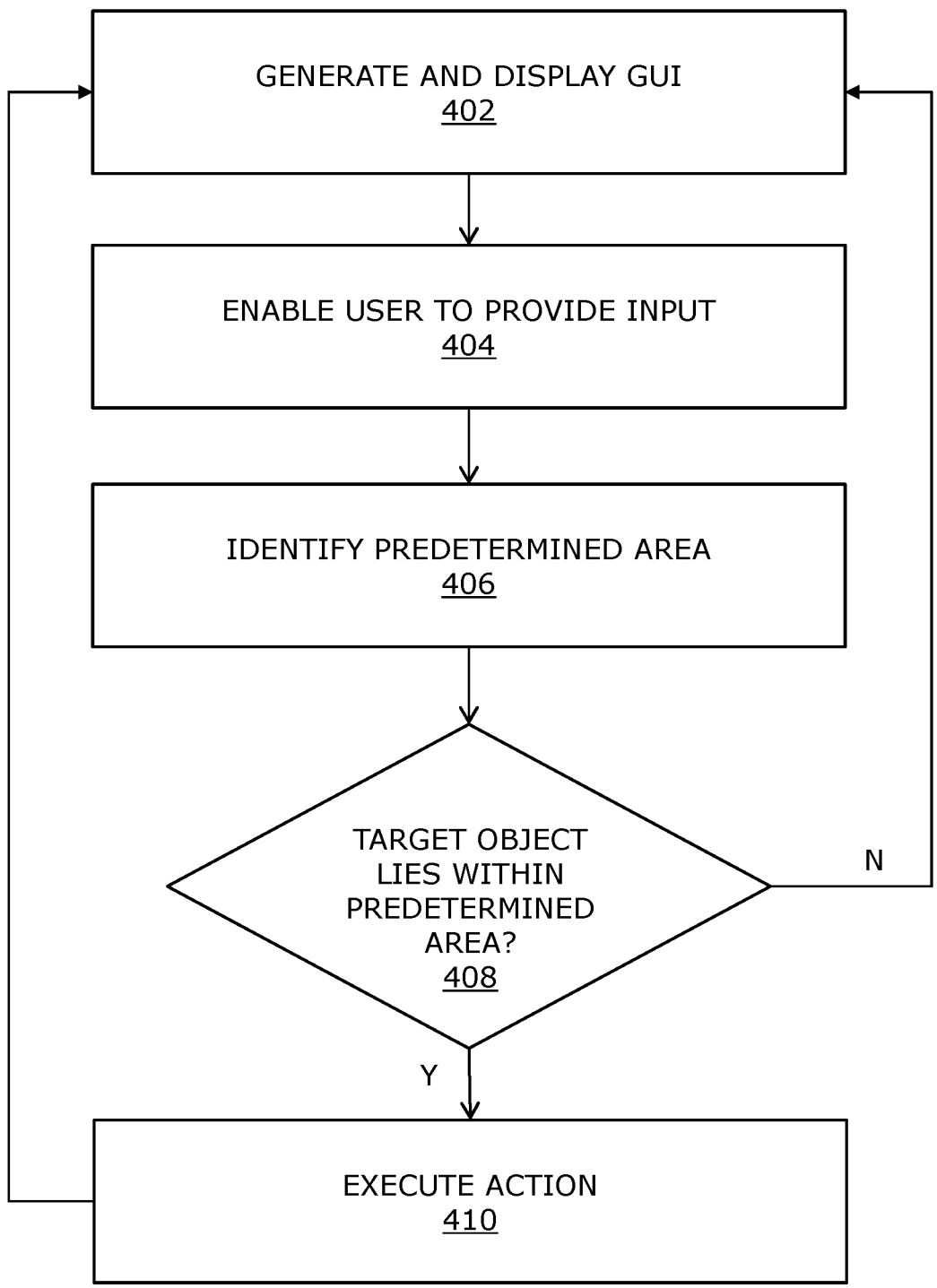
FIG. 4 depicts steps of a method for game control via a graphical user interface, in accordance with an embodiment of the present disclosure.

Referring to FIG. 4, illustrated are steps of a method for game control, in accordance with an embodiment of the present disclosure. At a step 402, a graphical user interface is generated and displayed on a display screen, wherein the graphical user interface presents at least one user-controllable object and at least one target object. At a step 404, a user is enabled to provide a user input to control a movement of the at least one user-controllable object within the graphical user interface. At a step 406, a predetermined area is identified around the at least one user-controllable object in the graphical user interface. At a step 408, it is detected whether or not the at least one target object lies within the predetermined area in the graphical user interface. If, at the step 408, it is detected that the at least one target object lies within the predetermined area, a step 410 is performed. In accordance with the step 410, an action is executed on the at least one target object from the at least one user-controllable object. Thereafter, a processing loop of the aforesaid steps is restarted at the step 402. If, at the step 408, it is detected that the at least one target object does not lie within the predetermined area, the processing loop of the aforesaid steps is restarted at the step 402.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. It will be appreciated that the terms "first", "second", "third" and the like used herein do not denote any order, quantity or importance, but rather are used to distinguish one element from another.

The invention claimed is:

1. An apparatus for game control via a graphical user interface, the apparatus comprising:

a display screen; and a processor configured to:

generate and display the graphical user interface on the display screen, wherein the graphical user interface presents at least one user-controllable object, at least one target object and a control object;

enable a user to provide a user input via the control object to control a movement of the at least one user-controllable object within the graphical user interface;

identify a predetermined area around the at least one user-controllable object in the graphical user interface;

present a boundary indicator representing a boundary of the predetermined area on the graphical user interface;

detect whether or not the control object is located inside the predetermined area while the boundary indicator is presented on the graphical user interface;

when it is detected that the control object is located inside the predetermined area while the boundary indicator is presented on the graphical user interface, re-locate the control object outside the predetermined area;

detect whether or not the at least one target object lies within the predetermined area in the graphical user interface; and when it is detected that the at least one target object lies within the predetermined area, execute an action on the at least one target object from the at least one user-controllable object.

2. The apparatus of claim 1, wherein the at least one user-controllable object comprises a plurality of user-controllable objects, and wherein the processor is configured to enable the user to control the movement of the plurality of user-controllable objects within the graphical user interface in a synchronized manner, based on the user input.

3. The apparatus of claim 1, wherein the at least one user-controllable object comprises a plurality of user-controllable objects, and wherein the processor is configured to execute a first action and a second action on the at least one target object from a first user-controllable object and a second user-controllable object, from amongst the plurality of user-controllable objects, respectively, when it is detected that the at least one target object lies within the predetermined area.

4. The apparatus of claim 1, wherein the processor is configured to present the boundary indicator only while the user provides the user input.

5. The apparatus of claim 1, wherein the graphical user interface presents the control object the processor is configured to:

enable the user to provide the user input via the control object; and enable the user to re-locate the control object within the graphical user interface.

6. The apparatus of claim 1, wherein the predetermined area is a two-dimensional shape, a centre of the two-dimensional shape being at a current location of the at least one user-controllable object, a distance between the centre and a boundary of the two-dimensional shape lies between 10% and 90% of a distance between opposite sides of the graphical user interface.

7. The apparatus of claim 1, wherein the predetermined area is a two-dimensional shape, a centre of the two-dimensional shape being at a current location of the at least one user-controllable object, a distance between the centre and a boundary of the two-dimensional shape lies between 20% and 80% of a distance between opposite sides of the graphical user interface.

8. The apparatus of claim 1, wherein the processor is configured to present at least one directional indicator representing a direction in which the at least one user-controllable object can be moved to find at least one additional target object that is not currently visible in the graphical user interface.

9. A computer-implemented method for game control via a graphical user interface, the method comprising:

generating and displaying the graphical user interface on a display screen, wherein the graphical user interface presents at least one user-controllable object, at least one target object and a control object;

enabling a user to provide a user input via the control object to control a movement of the at least one user-controllable object within the graphical user interface;

identifying a predetermined area around the at least one user-controllable object in the graphical user interface;

presenting a boundary indicator representing a boundary of the predetermined area on the graphical user interface;

detecting whether or not the control object is located inside the predetermined area while the boundary indicator is presented on the graphical user interface, and when it is detected that the control object is located inside the predetermined area while the boundary indicator is presented on the graphical user interface, re-locating the control object outside the predetermined area;

detecting whether or not the at least one target object lies within the predetermined area in the graphical user interface; and when it is detected that the at least one target object lies within the predetermined area, executing an action on the at least one target object from the at least one user-controllable object.

10. The computer-implemented method of claim 9, wherein the at least one user-controllable object comprises a plurality of user-controllable objects, and wherein the method further comprises enabling the user to control the movement of the plurality of user-controllable objects within the graphical user interface in a synchronized manner, based on the user input.

11. The computer-implemented method of claim 9, wherein the at least one user-controllable object comprises a plurality of user-controllable objects, and wherein the method further comprises executing a first action and a second action on the at least one target object from a first user-controllable object and a second user-controllable object, from amongst the plurality of user-controllable objects, respectively, when it is detected that the at least one target object lies within the predetermined area.

12. The computer-implemented method of claim 9, further comprising presenting the boundary indicator only while the user provides the user input.

13. The computer-implemented method of claim 9, wherein when the graphical user interface presents the control object the method further comprises:

enabling the user to provide the user input via the control object; and enabling the user to re-locate the control object within the graphical user interface.

14. The computer-implemented method of claim 9, wherein the predetermined area is a two-dimensional shape, a centre of the two-dimensional shape being at a current location of the at least one user-controllable object, a distance between the centre and a boundary of the two-dimensional shape lies between 10% and 90% of a distance between opposite sides of the graphical user interface.

15. The computer-implemented method of claim 9, further comprising presenting at least one directional indicator representing a direction in which the at least one user-controllable object can be moved to find at least one additional target object that is not currently visible in the graphical user interface.

16. A computer program product comprising a non-transitory computer-readable storage medium having computer-readable instructions for game control via a graphical user interface stored thereon, the computer-readable instructions being executable by a computing device to:

generate and display the graphical user interface on a display screen, wherein the graphical user interface presents at least one user-controllable object, at least one target object, and a control object;

enable a user to provide a user input via the control object to control a movement of the at least one user-controllable object within the graphical user interface;

identify a predetermined area around the at least one user-controllable object in the graphical user interface;

present a boundary indicator representing a boundary of the predetermined area on the graphical user interface;

detect whether or not the control object is located inside the predetermined area while the boundary indicator is presented on the graphical user interface, and when it is detected that the control object is located inside the predetermined area while the boundary indicator is presented on the graphical user interface, re-locating the control object outside the predetermined area;

detect whether or not the at least one target object lies within the predetermined area in the graphical user interface; and when it is detected that the at least one target object lies within the predetermined area, executing an action on the at least one target object from the at least one user-controllable object.

* * * * *